US012609384B2

(12) United States Patent
Choi et al.

(10) Patent No.: US 12,609,384 B2
(45) Date of Patent: Apr. 21, 2026

(54) BATTERY CELL AND BATTERY MODULE INCLUDING THE SAME

(71) Applicant: LG ENERGY SOLUTION, LTD., Seoul (KR)

(72) Inventors: Jonghwa Choi, Daejeon (KR); Myungki Park, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 580 days.

(21) Appl. No.: 17/436,774

(22) PCT Filed: Jun. 22, 2020

(86) PCT No.: PCT/KR2020/008052
§ 371 (c)(1),
(2) Date: Sep. 7, 2021

(87) PCT Pub. No.: WO2021/080112
PCT Pub. Date: Apr. 29, 2021

(65) Prior Publication Data
US 2022/0181728 A1      Jun. 9, 2022

(30) Foreign Application Priority Data
Oct. 24, 2019      (KR) ........................ 10-2019-0133048

(51) Int. Cl.
*H01M 50/184*            (2021.01)
*H01M 50/186*            (2021.01)
(Continued)

(52) U.S. Cl.
CPC ....... *H01M 50/184* (2021.01); *H01M 50/186* (2021.01); *H01M 50/548* (2021.01); *H01M 50/105* (2021.01); *H01M 50/557* (2021.01)

(58) Field of Classification Search
CPC ............. H01M 50/183; H01M 50/184; H01M 50/186; H01M 50/555; H01M 50/588;
(Continued)

(56) References Cited

U.S. PATENT DOCUMENTS 9,236,586 B2 *    1/2016    Park .................... H01M 10/425
2004/0038125 A1    2/2004    Kim et al.
(Continued)

FOREIGN PATENT DOCUMENTS

JP            2001-250516 A        9/2001
JP            2005-123158 A        5/2005
(Continued)

OTHER PUBLICATIONS

Du, S., Jia, M., Cheng, Y., Tang, Y., Zhang, H., Ai, L., . . . & Lai, Y. (2015). Study on the thermal behaviors of power lithium iron phosphate (LFP) aluminum-laminated battery with different tab configurations. International Journal of Thermal Sciences, 89, 327-336. (Year: 2015).*
(Continued)

*Primary Examiner* — Tiffany Legette
*Assistant Examiner* — Christine Disney
(74) *Attorney, Agent, or Firm* — Birch, Stewart, Kolasch & Birch, LLP

(57)            ABSTRACT
A battery cell has a case accommodating an electrode assembly; an electrode lead protruding from the case at front and rear ends of the case; a first sealing part formed at both side ends of the case; a second sealing part connecting the first sealing part at a portion in which the electrode lead is formed; a first cut surface formed by cutting the first sealing part; a second cut surface formed by cutting the second sealing part; and an insulating member covering the sealing parts and the cut surfaces, wherein the first sealing part is bent in a direction of a first surface of the case, and a main
(Continued)

portion of the insulating member is attached in a shape surrounding the first sealing part and the first cut surface, and wherein a side surface portion of the insulating member surrounds the second sealing part and the second cut surface.

12 Claims, 6 Drawing Sheets

(51) Int. Cl.
*H01M 50/548* (2021.01)
*H01M 50/105* (2021.01)
*H01M 50/557* (2021.01)

(58) Field of Classification Search
CPC .. H01M 50/105; H01M 50/10; H01M 50/116; H01M 50/19; H01M 50/191; H01M 50/193; H01M 50/195; H01M 50/197
See application file for complete search history.

(56) References Cited

U.S. PATENT DOCUMENTS

| | | | |
|---|---|---|---|
| 2005/0084749 A1 | 4/2005 | Hwang et al. | |
| 2005/0142439 A1 | 6/2005 | Lee et al. | |
| 2006/0127756 A1 | 6/2006 | Seo | |
| 2010/0203381 A1 | 8/2010 | Kim et al. | |
| 2011/0117394 A1 | 5/2011 | Hwang et al. | |
| 2011/0223474 A1 | 9/2011 | Kim et al. | |
| 2012/0148888 A1 | 6/2012 | Yun | |
| 2015/0056498 A1* | 2/2015 | Jo | H01M 50/124 |
| | | | 429/179 |
| 2017/0194606 A1 | 7/2017 | Lim et al. | |
| 2018/0040913 A1 | 2/2018 | Han | |
| 2018/0241023 A1 | 8/2018 | Lim et al. | |
| 2018/0315977 A1 | 11/2018 | Park et al. | |
| 2019/0198909 A1* | 6/2019 | Qiu | H01M 50/186 |
| 2020/0235360 A1 | 7/2020 | Lim et al. | |

FOREIGN PATENT DOCUMENTS

| | | | |
|---|---|---|---|
| JP | 2005-197218 A | 7/2005 | |
| JP | 2006-156402 A | 6/2006 | |
| JP | 2010-92673 A | 4/2010 | |
| JP | 2013-157286 A | 8/2013 | |
| JP | 2015-165459 A | 9/2015 | |
| JP | 2018-521481 A | 8/2018 | |
| KR | 10-0472504 B1 | 3/2005 | |
| KR | 10-2005-0036466 A | 4/2005 | |
| KR | 10-2010-0016719 A | 2/2010 | |
| KR | 10-1095344 B1 | 12/2011 | |
| KR | 10-2012-0066496 A | 6/2012 | |
| KR | 10-2016-0115531 A | 10/2016 | |
| KR | 10-2016-0128835 A | 11/2016 | |
| KR | 10-2017-0022511 A | 3/2017 | |
| KR | 10-2017-0049014 A | 5/2017 | |
| KR | 10-2018-0083123 A | 7/2018 | |
| KR | 10-2018-0107056 A | 10/2018 | |

OTHER PUBLICATIONS

Extended European Search Report for European Application No. 20878518.8, dated May 16, 2022.

International Search Report (PCT/ISA/210) issued in PCT/KR2020/008052 mailed on Oct. 5, 2020.

Thaler et al., "Automotive Battery Technology," Beijing Institute of Technology Press, Feb. 28, 2017, 31 pages total, with English excerpt.

* cited by examiner

[FIG. 1] - Conventional Art
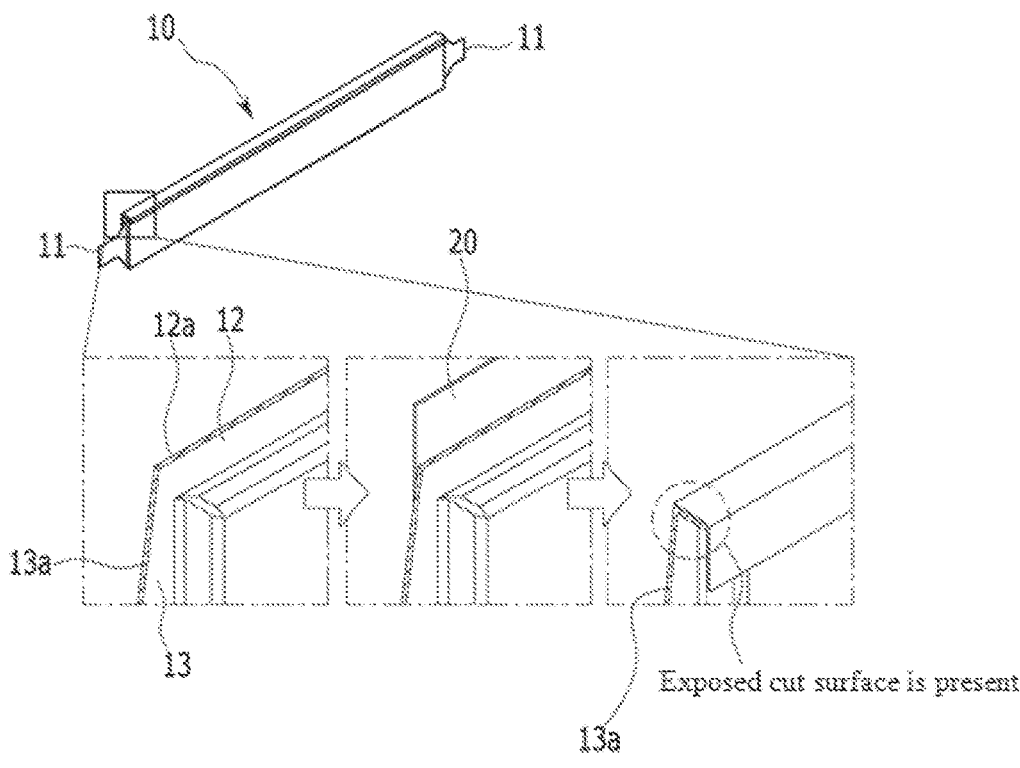

[FIG. 2]
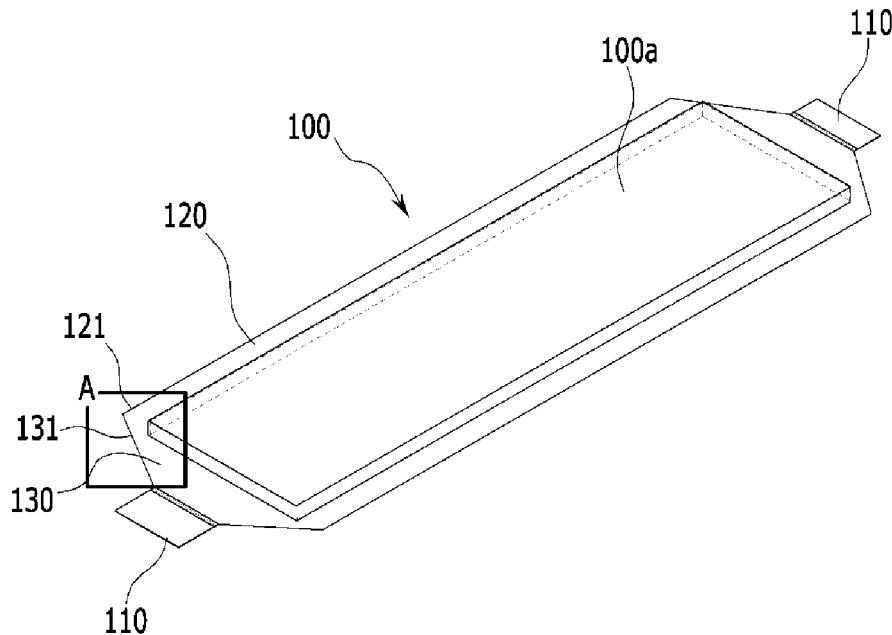
[FIG. 3]
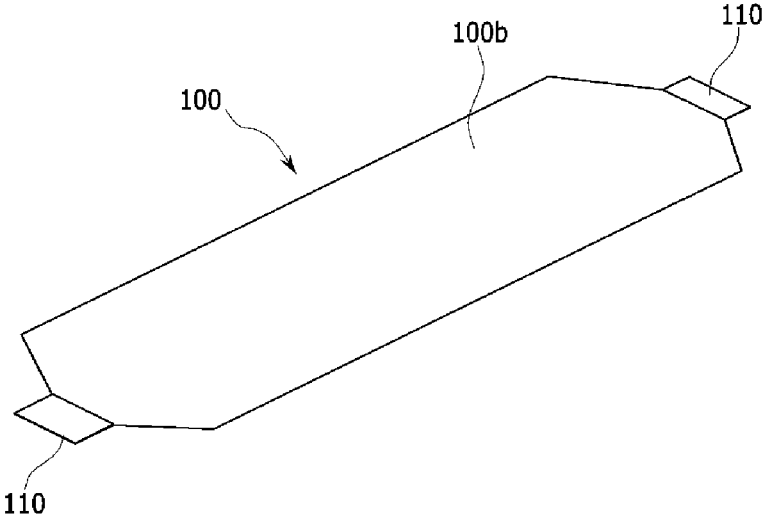

[FIG. 4]
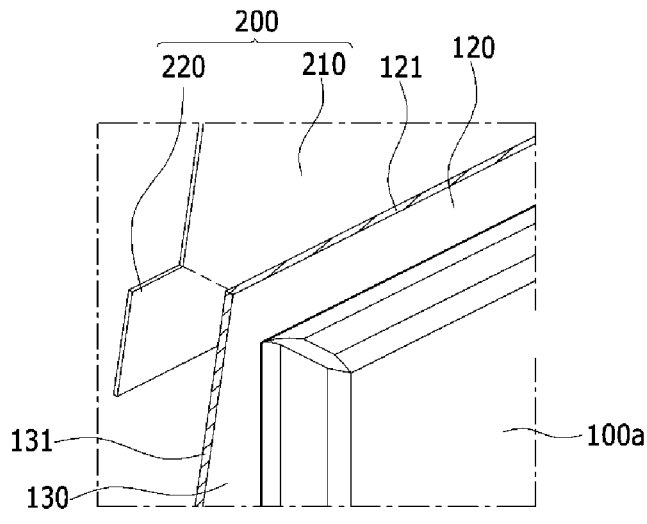

[FIG. 5]
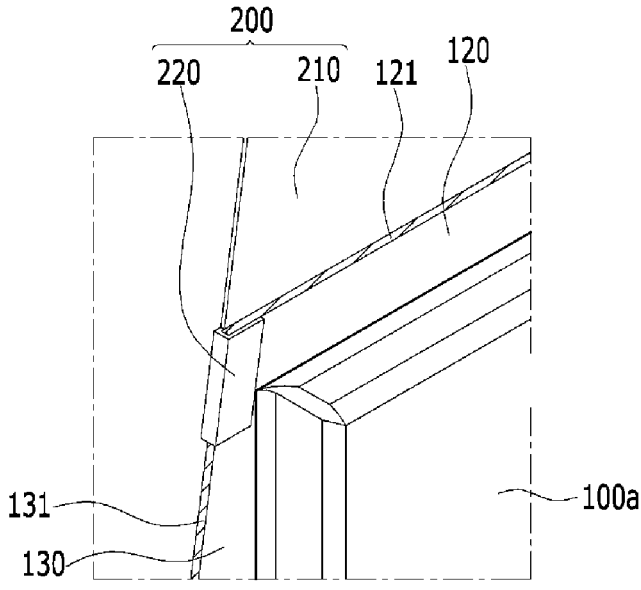
[FIG. 6]
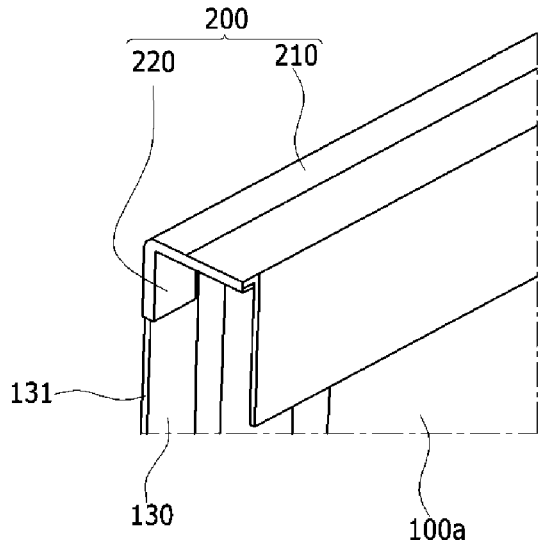

[FIG. 7]
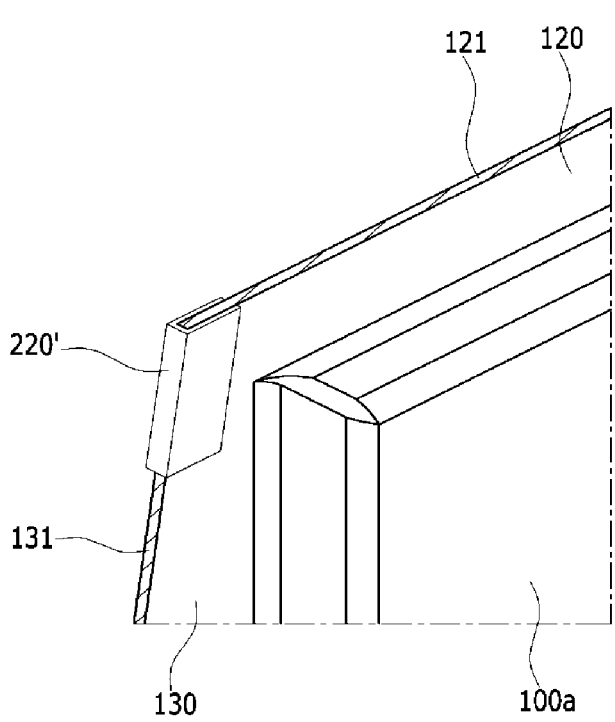

[FIG. 8]
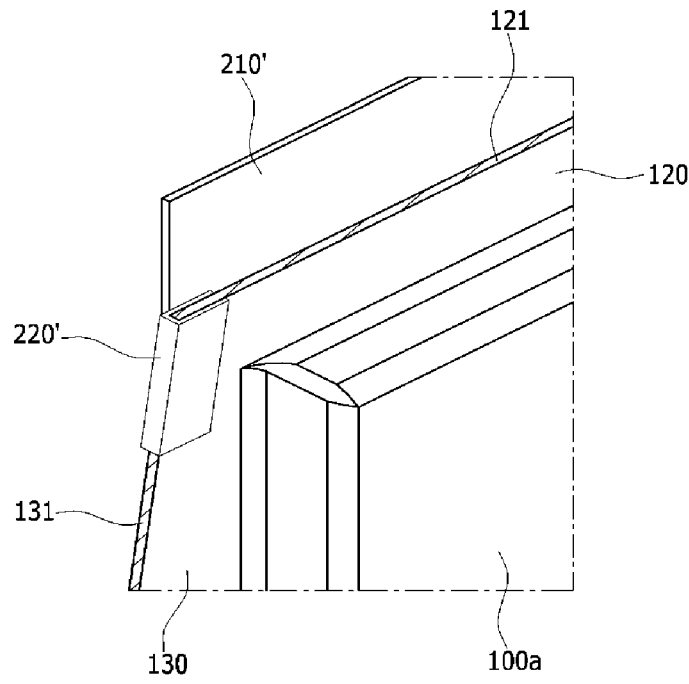
[FIG. 9]
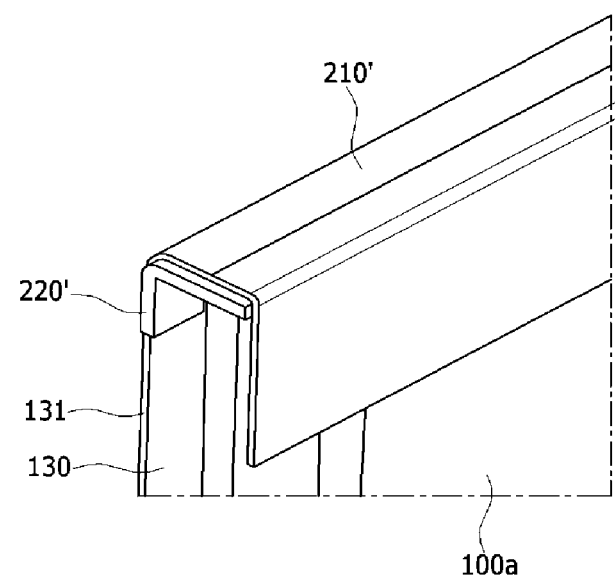

BATTERY CELL AND BATTERY MODULE INCLUDING THE SAME

CROSS CITATION WITH RELATED APPLICATION(S)

This application claims the benefit of Korean Patent Application No. 10-2019-0133048 filed on Oct. 24, 2019 with the Korean Intellectual Property Office, the disclosure of which is incorporated herein by reference in its entirety.

TECHNICAL FIELD

The present disclosure relates to a battery cell and a battery module including the same, and more particularly, to a battery cell capable of securing an insulation performance and a battery module including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery cell may include a case accommodating an electrode assembly, an electrode lead formed to protrude from the case at front and rear ends of the case, and a sealing part formed at borders of the case.

FIG. 1 is a perspective view showing a conventional battery cell.

Referring to FIG. 1, the conventional battery cell may comprise a case 10 accommodating an electrode assembly, an electrode lead 11 formed to protrude from the case at front and rear ends of the case 10, a first sealing part 12 formed at both side ends of the case, a second sealing part 13 connecting the first sealing part 12 at a portion in which the electrode lead 11 is formed, a first cut surface 12a formed by cutting the first sealing part, a second cut surface 13a formed by cutting the second sealing part, and an insulating member 20 covering the sealing parts and the cut surfaces.

In this case, as shown in FIG. 1, the conventional insulating member 20 covers only the first cut surface 12a so that the second cut surface 13a is exposed to the outside. As the second cut surface 13a is exposed to the outside, the cut surface of the case of the battery cell is exposed to the outside, thereby deteriorating an insulation performance of the battery cell.

DETAILED DESCRIPTION OF THE INVENTION

Technical Problem

The present disclosure has been designed to solve the above-mentioned problems and therefore, it is an object of the present disclosure to provide a battery cell capable of securing an insulation performance, and a battery module including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In order to achieve the above object, one embodiment of the present disclosure provides a battery cell and a battery module including the same, the battery cell comprising: a case accommodating an electrode assembly, the case having a front end, a rear end and side ends, a first surface and a second surface; an electrode lead protruding from the case at each of the front end and the rear end of the case; a first sealing part formed at both side ends of the case; a second sealing part connecting the first sealing part at a portion in which the electrode lead is formed; a first cut surface formed by cutting the first sealing part; a second cut surface formed by cutting the second sealing part; and an insulating member covering the sealing parts and the cut surfaces, wherein the first sealing part is bent in a direction of a first surface of the case, and a main portion of the insulating member surrounds the first sealing part and the first cut surface, and wherein a side surface portion of the insulating member surrounds the second sealing part and the second cut surface.

Another embodiment of the present disclosure provides a method for manufacturing a battery cell comprising: the steps of: attaching a side surface portion of an insulating member to surround a second sealing part and a second cut surface of a battery case; bending a first sealing part in a direction of a first surface of a case; and attaching a main portion of the insulating member to surround the bent first sealing part and a first cut surface.

The main portion of the insulating member and the side surface portion of the insulating member may be separated, and the main portion and the side surface portion may overlap on the second surface of the case.

The second cut surface may be tilted toward the electrode lead, and the side surface portion of the insulating member may be protrudingly formed to correspond to a cut line of the second cut surface.

The main portion of the insulating member may be attached to cover the second surface, the first sealing part, the first cut surface, and a part of the first surface.

The insulating member may be a tape.

The main portion of the insulating member and the side surface portion of the insulating member may be separated, and the method may further include attaching a part of the main portion of the insulating member onto the second surface of the case, after the step of attaching the side surface portion of the insulating member to surround the second sealing part and the second cut surface.

In the step of attaching the main portion of the insulating member to surround the bent first sealing part and the first cut surface, a part of the main portion of the insulating member excluding a portion attached to the second surface may be attached.

The method may further include attaching a part of the main portion of the insulating member onto the second surface of the case, before the step of attaching the side surface portion of the insulating member to surround the second sealing part and the second cut surface.

In the step of attaching the main portion of the insulating member to surround the bent first sealing part and the first cut surface, a part of the main portion of the insulating member excluding a portion attached to the second surface may be attached.

Advantageous Effects

A battery cell and a battery module including the same according to one embodiment of the present disclosure provides the effects capable of enhancing an insulation performance of the battery cell, and securing the insulation performance without addition of other battery module components by changing a shape of an insulating member or applying an additional insulating member.

The effects of the present disclosure are not limited to the above-mentioned effects, and other effects not mentioned will be clearly understood by those skilled in the art from the description of the claims.

DETAILED DESCRIPTION OF THE DRAWINGS

FIG. 1 is a perspective view showing a conventional battery module.

FIG. 2 is a view showing a battery cell according to an embodiment of the present disclosure.

FIG. 3 is a view reversely showing the battery cell of FIG. 2.

FIG. 4 is a view showing the part A of FIG. 2 according to an embodiment of the present disclosure.

FIG. 5 is a view showing that a side surface portion in FIG. 4 is attached in a shape surrounding a second sealing part and a second cut surface.

FIG. 6 is a view showing that a main portion in FIG. 5 is attached in a shape surrounding a bent first sealing part and a first cut surface.

FIG. 7 is a view showing the part A of FIG. 2 according to another embodiment of the present disclosure.

FIG. 8 is a view showing that a side surface portion in FIG. 7 is attached in a shape surrounding a second sealing part and a second cut surface.

FIG. 9 is a view showing that a main portion in FIG. 8 is attached in a shape surrounding a bent first sealing part and a first cut surface.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery cell according to an embodiment of the present disclosure will be described with reference to FIGS. 2 and 3.

FIG. 2 is a view showing a battery cell according to an embodiment of the present disclosure. FIG. 3 is a view reversely showing the battery cell of FIG. 2.

Referring to FIGS. 2 and 3, the battery cell according to an embodiment of the present disclosure includes a case 100 for accommodating an electrode assembly, an electrode lead 110 formed to protrude from the case 100 at front and rear ends of the case 100, a first sealing part 120 formed on both side ends of the case 100, a second sealing part 130 connecting the first sealing part 120 at a portion in which the electrode lead 110 is formed, a first cut surface 121 formed by cutting the first sealing part 120, and a second cut surface 131 formed by cutting the second sealing part 130.

The electrode assembly may be composed of a positive electrode plate, a negative electrode plate, and a separator. The case 100 is for packaging the electrode assembly and may be formed of a laminate sheet including a resin layer and a metal layer.

The electrode lead 110 may be electrically connected to the electrode assembly. This electrode lead 110 may be provided as a pair. The battery cell according to an embodiment of the present disclosure has a structure in which the two electrode leads 110 are opposite to each other and protrude from both ends of the case 100.

The sealing parts 120 and 130 may be formed to be flat at borders of the case 100. A first surface 100$a$ and a second surface 100$b$ forming the case 100 may be adhered to each other in the sealing parts 120 and 130. In the sealing parts 120 and 130, the first surface 100$a$ and the second surface 100$b$ may be sealed by a method such as a thermal fusion. Thereby, the electrical connection between the electrode assembly accommodated inside the sealing parts and the outside may be cut off.

The sealing parts 120 and 130 may be formed of a first sealing part 120 and a second sealing part 130. The first sealing part 120 may be formed at both side ends of the case 100 on which the electrode lead 110 is not formed. The second sealing part 130 may be formed to connect the first sealing part 120 at a portion in which the electrode lead 110 is formed. Both the first and second sealing parts 120 and 130 may be formed at the borders of the case 100 to insulate the electrode assembly inside the case 100 from the outside.

The first cut surface 121 may be formed at an end of the first sealing part 120, and the second cut surface 131 may be formed at an end of the second sealing part 130. The first and second sealing parts 120 and 130 have a structure formed by joining the first surface 100*a* and the second surface 100*b* of the case 100, and ends of the first and second sealing parts 120 and 130 may be formed with the cut surfaces 121 and 131 made by cutting the joined first surface 100*a* and second surface 100*b* together. Since electrical connection between the electrode assembly and the outside can be made through these cut surfaces 121 and 131, the electrical connection between the electrode assembly and the outside can be cut off by covering the cut surfaces through the insulating member to be described later.

Hereinafter, a battery cell to which the insulating member is attached according to an embodiment of the present disclosure will be described with reference to FIGS. 4 to 6.

FIG. 4 is a view showing the part A of FIG. 2 according to an embodiment of the present disclosure. FIG. 5 is a view showing that a side surface portion in FIG. 4 is attached in a shape surrounding a second sealing part and a second cut surface. FIG. 6 is a view showing that a main portion in FIG. 5 is attached in a shape surrounding a bent first sealing part and a first cut surface.

Referring to FIGS. 4 to 6, the battery cell according to an embodiment of the present disclosure comprises an insulating member 200 covering the sealing parts 120 and 130 and the cut surfaces 121 and 131, wherein the first sealing part 120 is bent in a direction of a first surface 100*a* of a case 100, and wherein a main portion 210 of the insulating member 200 is attached in the shape surrounding the first sealing part 120 and the first cut surface 121 and a side surface portion 220 of the insulating member 200 is attached in the shape surrounding the second sealing part 130 and the second cut surface 131.

As shown in FIG. 6, the main portion 210 of the insulating member 200 may be attached to cover the first sealing part 120, the first cut surface 121, and a part of the first surface 100*a*. Through this, the insulating member 200 is allowed to cover not only the bent part of the first sealing part 120, but also a part of the first surface 100*a* that meets the bent first sealing part 120, whereby it is possible to fundamentally block the deterioration of the insulation performance through the first cut surface 121.

According to an embodiment of the present disclosure, the insulating member 200 may be formed of a tape, but is not limited thereto, and the cut surfaces may be covered through various insulating members.

Conventionally, the first sealing part 120 is only covered through only the main portion 210 of the insulating member 200 of the present disclosure so that the second cut surface 131 formed on the second sealing part 130 is exposed to the outside, which results in deteriorating the insulation performance from a module frame. However, according to an embodiment of the present disclosure, the side surface portion 220 is formed on the insulating member 200 to cover the second cut surface 131 formed on the second sealing part 130, whereby the insulation performance between the battery cell and the module frame can be improved.

According to an embodiment of the present disclosure, the second cut surface 131 is formed to be tilted toward the electrode lead 110, and the side surface portion 220 of the insulating member 200 may be protrudingly formed to correspond to a cut line of the second cut surface 131. Conventionally, attempts have been made to cover the second cut surface in a manner that a side surface of the existing insulating member is folded to cover the second cut surface. However, according to an embodiment of the present disclosure, the side surface portion 220 is formed to correspond to the second cut surface 131 formed in a direction different from the main portion 210 so that such a side surface portion 220 can easily cover the corresponding second cut surface 131, making it possible to provide an effect of simplifying the process of attaching the insulating member to the second cut surface.

Hereinafter, a battery cell to which an insulating member is attached according to another embodiment of the present disclosure will be described with reference to FIGS. 7 to 9.

FIG. 7 is a view showing the part A of FIG. 2 according to another embodiment of the present disclosure. FIG. 8 is a view showing that a side surface portion in FIG. 7 is attached in a shape surrounding a second sealing part and a second cut surface. FIG. 9 is a view showing that a main portion in FIG. 8 is attached in a shape surrounding a bent first sealing part and a first cut surface.

Referring to FIGS. 7 to 9, a battery cell according to another embodiment of the present disclosure may be formed by separating a main portion 210' and a side surface portion 220' of an insulating member 200. Accordingly, the main portion 210' may be attached to a first cut surface 121 of a first sealing part 120 and the side surface portion 220' may be attached to a second cut surface 131 of a second sealing part 130, respectively. In addition, the main portion 210' and the side surface portion 220' may overlap on a second surface 100*b* of the case.

The contents except for those described above are the same as the battery cell according to one embodiment of the present disclosure described above.

Hereinafter, a method for manufacturing a battery cell to which an insulating member is attached according to an embodiment of the present disclosure will be described with reference to FIGS. 4 to 6.

Referring to FIGS. 4 to 6, the method for manufacturing the battery cell according to an embodiment of the present disclosure comprises sequentially performing the steps of: attaching a side surface portion 220 of an insulating member 200 in a shape surrounding a second sealing part 130 and a second cut surface 131 (FIG. 5), bending a first sealing part 120 in a direction of a first surface 100*a* of a case 100, and attaching a main portion 210 of the insulating member 200 in a shape surrounding the bent first sealing part 120 and a first cut surface 121 (FIG. 6).

According to an embodiment of the present disclosure, before the step of attaching the side surface portion 220 of the insulating member 200 in the shape surrounding the second sealing part 130 and the second cut surface 131, a step (FIG. 4) of attaching a part of the main portion 210 of the insulating member 200 onto a second surface 100*b* of the case 100 may be further included in the method of the present disclosure. In this case, in the step of attaching the main portion 210 of the insulating member 200 in the shape surrounding the bent first sealing part 120 and the first cut surface 121, a part of the main portion 210 of the insulating member 200 excluding a portion attached to the second surface may be attached.

Hereinafter, a method for manufacturing a battery cell to which an insulating member is attached according to another embodiment of the present disclosure will be described with reference to FIGS. 7 to 9.

Referring to FIGS. 7 to 9, the battery cell according to another embodiment of the present disclosure may be formed by separating a main portion 210' and a side surface portion 220' of the insulating member 200. In addition, the method for manufacturing the battery cell comprises sequentially performing the steps of: attaching the side surface portion 220' of the insulating member 200 in a shape surrounding a second sealing part 130 and a second cut surface 131 (FIG. 7), bending a first sealing part 120 in a direction of a first surface 100a of a case 100, and attaching the main portion 210' of the insulating member 200 in a shape surrounding the bent first sealing part 120 and a first cut surface 121 (FIG. 9).

According to another embodiment of the present disclosure, after the step of attaching the side surface portion of the insulating member 200 in the shape surrounding the second sealing part 130 and the second cut surface 131, a step (FIG. 8) of attaching a part of the main portion 210' of the insulating member 200 onto a second surface 100b of the case 100 may be further included in the method of the present disclosure. In this case, in the step of attaching the main portion 210' of the insulating member 200 in the shape surrounding the bent first sealing part 120 and the first cut surface 121, a part of the main portion 210 of the insulating member 200 excluding a portion attached to the second surface may be attached.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: case
100a: first surface
100b: second surface
110: electrode lead
120: first sealing part
121: first cut surface
130: second sealing part
131: second cut surface
200: insulating member
210, 210': main portion
220, 220': side surface portion
The invention claimed is:

1. A battery cell comprising:
a case accommodating an electrode assembly, the case having a front end, a rear end and side ends, a first surface and a second surface;
an electrode lead protruding from the case at each of the front end and the rear end of the case;
a first sealing part formed at both side ends of the case;
a second sealing part connecting the first sealing part at the front end and the rear end of the case;
a first edge along the first sealing part;
a second edge along the second sealing part; and
an insulating member covering the sealing parts and the edges,
wherein the first sealing part extends to the second edge and is bent in a direction of the first surface of the case so that a first side of the first sealing part is folded against a first side end, and a main portion of the insulating member covers a second side of the first sealing part and the first edge and attaches to the first surface of the case,
wherein a side surface portion of the insulating member directly contacts the first side of the first sealing part, a first side of the second sealing part and the second edge,
wherein the main portion and the side surface portion of the insulating member are formed as one piece,
wherein a bottom edge of the main portion is colinear with a bottom edge of the side surface portion and is below the first sealing part so that the main portion overlies the second surface of the case, and
wherein a side edge of a portion of the main portion overlying the first surface of the case extends to the second edge.

2. The battery cell according to claim 1, wherein the second edge is tilted toward the electrode lead, and the side surface portion of the insulating member is protrudingly formed to correspond to a cut line of the second edge.

3. The battery cell according to claim 1, wherein the main portion of the insulating member is attached to cover a second surface of the case.

4. The battery cell according to claim 1, wherein the insulating member is a tape.

5. A battery module comprising the battery cell of claim 1.

6. The battery cell according to claim 1, wherein the side surface portion of the insulating member extends to the first edge of the first sealing part.

7. The battery cell according to claim 1, wherein the first sealing part and second sealing part extend from the second surface of the case.

8. The battery cell according to claim 1, wherein the side surface portion of the insulating member extends from a side edge of the main portion of the insulating member, and
wherein the side edge of the main portion of the insulating member aligns with the first edge and the second edge.

9. A method for manufacturing a battery cell comprising the steps of:
attaching a side surface portion of an insulating member to surround a second sealing part and a second edge of a battery case;
bending a first sealing part in a direction of a first surface of a case; and
attaching a main portion of the insulating member to cover the bent first sealing part, a first edge of the first sealing part and attach to the first surface of a case,
covering a second side of the first sealing part and the first edge with a main portion of the insulating member and attaching the main portion of the insulating member to the first surface of the case,
directly contacting the first side of the first sealing part, a first side of the second sealing part and the second edge with a side surface portion of the insulating member,
wherein the main portion and the side surface portion of the insulating member are formed as one piece,
wherein a bottom edge of the main portion is colinear with a bottom edge of the side surface portion and is below the first sealing part so that the main portion overlies the second surface of the case, and
wherein a side edge of a portion of the main portion overlying the first surface of the case extends to the second edge.

10. The method for manufacturing the battery cell according to claim 9, wherein, in the step of attaching the main portion of the insulating to surround the bent first sealing part and the first edge, a part of the main portion of the insulating member excluding a portion attached to the second surface is attached.

11. The method for manufacturing the battery cell according to claim 9, further comprising:

attaching a part of the main portion of the insulating member onto the second surface of the case, before the step of attaching the side surface portion of the insulating member in to surround the second sealing part and the second edge.

12. The method for manufacturing the battery cell according to claim 11, wherein, in the step of attaching the main portion of the insulating member to surround the bent first sealing part and the first edge, a portion excluding a portion attached to the second surface in the main portion of the insulating member is attached.

* * * * *